United States Patent [19]
Zipf et al.

[11] Patent Number: 5,604,640
[45] Date of Patent: Feb. 18, 1997

[54] BUSINESS CARD SCANNER AND METHOD OF USE

[75] Inventors: Mary J. Zipf, Tempe; Karen E. Jachimowicz, Laveen, both of Ariz.

[73] Assignee: Motorola, Schaumburg, Ill.

[21] Appl. No.: 499,650

[22] Filed: Jul. 14, 1995

Related U.S. Application Data

[63] Continuation of Ser. No. 189,778, Jan. 31, 1994, abandoned.
[51] Int. Cl.⁶ ............................ G02B 27/02; G06K 5/00; G06K 7/10
[52] U.S. Cl. .................... 359/803; 359/802; 235/380; 235/472
[58] Field of Search ............................... 235/476, 475; 359/802, 803; 280/456, 457

[56] References Cited

U.S. PATENT DOCUMENTS

| | | | |
|---|---|---|---|
| 5,038,023 | 8/1991 | Saliga | 235/456 |
| 5,103,490 | 4/1992 | McMillin | 235/440 |
| 5,130,853 | 7/1992 | Sakurai | 359/803 |
| 5,206,520 | 4/1993 | Filo | 235/468 |
| 5,224,198 | 6/1993 | Jachimowicz et al. | 359/13 |
| 5,231,276 | 7/1993 | Yoshihara | 235/449 |
| 5,285,056 | 2/1994 | Tedesco et al. | 235/455 |

Primary Examiner—Thong Nguyen
Assistant Examiner—Audrey Chang
Attorney, Agent, or Firm—Gary F. Witting; Eugene A. Parsons

[57] ABSTRACT

A business card scanning system (101) is provided. A hollow body (102) having an exterior surface, an interior surface, a first aperture (104), and a second aperture (103) is formed. The first aperture (104) is used for inserting a business card (111) into the hollow body (102) past a sensor (109) to generate data. A display (405) is positioned in the hollow body (102) for viewing. Data is subsequently processed by the data processing circuits (409) and stored in the data storage circuits (409).

20 Claims, 4 Drawing Sheets

BUSINESS CARD SCANNER AND METHOD OF USE

This application is a continuation of prior application Ser. No. 08/189,778, filed Jan. 31, 1994, now abandoned.

BACKGROUND OF THE INVENTION

This invention relates, in general, to optoelectronic devices and, in particular, to scanning mixed media information cards, storing the information, and displaying the scanned information in a variety of display formats.

Currently, business cards are made of paper materials having a wide range of information disposed thereon. Business people routinely exchange these business cards for a variety of reasons, such as to introduce themselves and to provide relevant information (e.g., a telephone number, a fax number, an address, an E-mail address, or the like), thereby promoting business contacts and communications. Since these business cards are distributed routinely, a large number of business cards are accumulated over a relatively short period of time. As a result of the large number or volume of business cards exchanged, the information on the business card is not easily utilized.

Typically, these business cards are kept in a hard copy format and stored in a storage device, such as a file, a folder, a book, or the like. Generally, these storage devices are large and bulky, thus not enabling the business cards to be easily transported or used. Further, since current business cards typically are in a hard copy format and not in an electronic format, sorting of the business cards through a variety of key words is not achievable, thus making conventional business cards not as convenient or usable as would be desired.

It can be readily seen that the present or current use of business cards have severe limitations. Also, it is evident that current methods of collecting, sorting, and using, business cards are not as efficient or as useful as is desirable. Therefore, an article coupling electronic format to business cards that is cost effective, simplistic, portable, and highly manufacturable would be highly desirable.

SUMMARY OF THE INVENTION

Briefly stated, a business card scanning system is provided. A hollow body having an exterior surface, an interior surface, a first aperture, and a second aperture is formed. The first aperture is used for inserting a business card into the hollow body. A visual display system is positioned in the second aperture of the hollow body for viewing the inserted business card. A data scanning system including a sensor, data processing circuits, and data storage circuits is mounted in the hollow body. The sensor of the data scanning system scans the business card to generate data therefrom. Data is subsequently processed by the data processing circuits and stored in the data storage circuits.

DETAILED DESCRIPTION OF THE DRAWINGS

Figure 1:
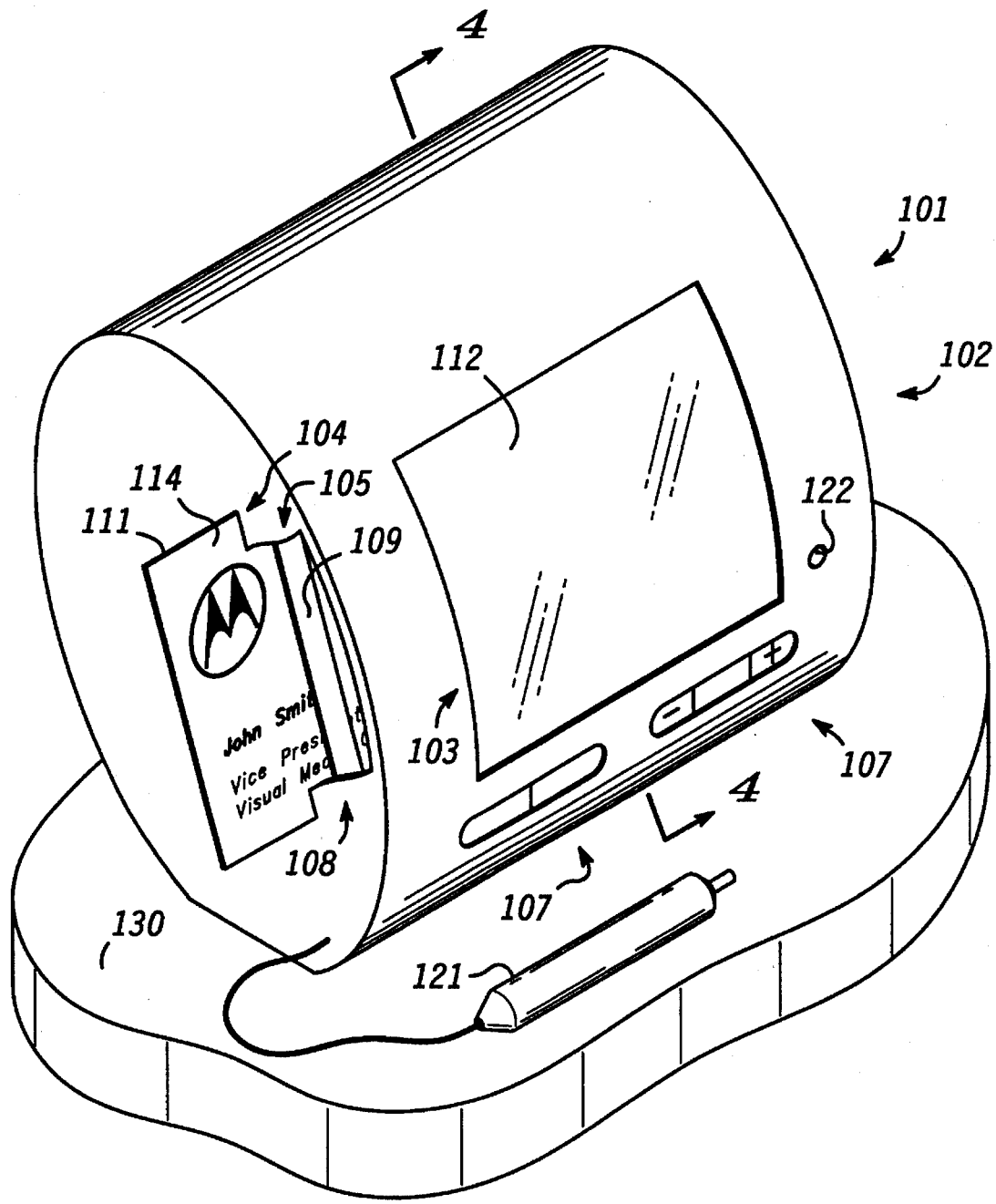
FIG. 1 is a simplified pictorial perspective view of a business card scanner having a portion thereof broken away.

Referring to FIG. 1, a perspective view of a business card scanning system 101 is illustrated having a portion 105 thereof broken away and resting on a substrate 130, such as a desk, table, or the like. It should be understood that business card scanning system 101 in the embodiment depicted in FIG. 1 is a desk top model; however, business card scanning system 101 is capable of being utilized as a hand held unit. Business card scanning system 101 includes several major components, such as a hollow body 102, apertures or openings 103 and 104, a plurality of control keys or function keys 107, and a data scanning system 108. Additionally, as is also shown in FIG. 1, a business card 111 is illustrated in part.

Hollow body 102 is made of any suitable well-known material in the art, such as plastic, metal, resin, or the like, as well as being formed by any suitable well-known method in the art such as molding, injection molding, milling, or the like. Further, it should be understood that hollow body 102 can be made of more than one piece, thus enabling a multiple piece hollow body 102 to be constructed. In a preferred embodiment of the present invention, hollow body 102 is injection molded with plastic molding materials, as well as having a plurality of pieces that are interlocked together.

The plurality of function keys or control keys 107 are located on hollow body 102 for easy access and use. The plurality of function keys or control keys 107 allow a user to access a variety of controls, such as positioning the business card, displaying the business card, scanning the business card, displaying a previously scanned business card, and sorting routines that enable the user to organize the previously scanned business cards. Generally, sorting routines are done utilizing any suitable method, such as alphabetic, numeric, name, or the like. The plurality of control keys 107 are made and installed in hollow body 102 by well-known methods in the art. Further, it should be understood that the plurality of control keys 107 are operably connected to a computer or processing center, described hereinafter, by any suitable well-known method in the art.

Opening 103 provides a viewing port 112 to enable the user to directly perceive or view business card 111, to directly perceive or view an enlargement of business card 111, or to directly perceive or view a representation of a previously scanned business card. By way of example only, direct viewing of business card 111 is achieved by moving business card 111 under viewing port 112 and having viewing port 112 made of a non-refractive and non-diffractive element, such as a transparent piece of plastic. Alternatively, business card 111 is enlargeable by using optical elements, such as a refractive optical element, a diffractive optical element, or combination thereof. Use of refractive and diffractive optical elements in viewing port 112 enables the user to obtain a substantial amount of eye relief, thereby enabling the user to perceive or view business card 111 with ease and comfort.

Business card 111 is made utilizing any suitable encoding technology, such as paper print technology, magnetically encoding technology, bar encoding technology, or the like. Each of these technologies can either be utilized singly or in combination with each other, thereby enabling business card 111 to have a mixed media format which is custom tailored to individual applications. For example, with business card 111 being made of a plastic material utilizing print or graphic technology, as well as utilizing magnetic encoding technology, surface 114 of business card 111 expresses graphical and textual images (e.g., a picture of the owner of the business card, telephone number, address, and the like), while the magnetic encoding of business card 111 enables a list of products and their associated specifications to be encoded into business card 111, thereby enabling the owner of the business card 111 to more effectively communicate to his customer. Additionally, it should be understood that mixing the various encoding technologies into business card 111 enables business card 111 to be more flexible in function than the conventional business cards used today.

Sensor system 108 is utilizes any suitable technology or any combination of technologies, such as optical technologies, magnetic technologies, or the like. For example, with scanning system 108 using optical technology, a sensor 109 is a photosensor or a photodiode that detects information depicted or embedded on business card 111 as business card 111 passes by sensor 109. Further, it should be noted that additional sensors are added to business card scanning system 101 so as to detect a variety of encoded information on business card 111.

By way of example only, with scanning system 108 being a photo scanning system, sensor 109 typically includes any suitable photodetector array having photodiodes, pin photodiodes, or the like. As business card 111 passes by sensor 109, graphical and textual information is sensed by sensor 109 and converted into electrical signals. The electrical signals are subsequently sent to electronics 401 (shown in FIG. 4) for processing, storage, and the like. A more detailed description of a photo scanning system 108 is found in a copending application entitled, OPTICAL READING HEAD AND METHOD FOR MAKING, bearing U.S. Ser. No. 08/012,488, with attorney docket no. CR07881 and filed Feb. 2, 1993.

Additionally, a light pen 121 is sometimes incorporated into business card scanning system 101 as an alternative method for transmitting data from business card 111 into business card scanning system 101. In this embodiment, data is encoded on business card 111 in a bar code format. Light pen 121 is moved across the bar codes on business card 111, thereby transmitting the data from the bar codes through light pen 121 and into the electronics (shown in FIG. 4) in business card scanning system 101.

Further, an accessory port 122 provides a method to integrate or couple business card scanning system 101 to a variety of electronic accessories, such as a personal digital assistant (PDA), a personal computer (PC), and the like.

Figure 2:
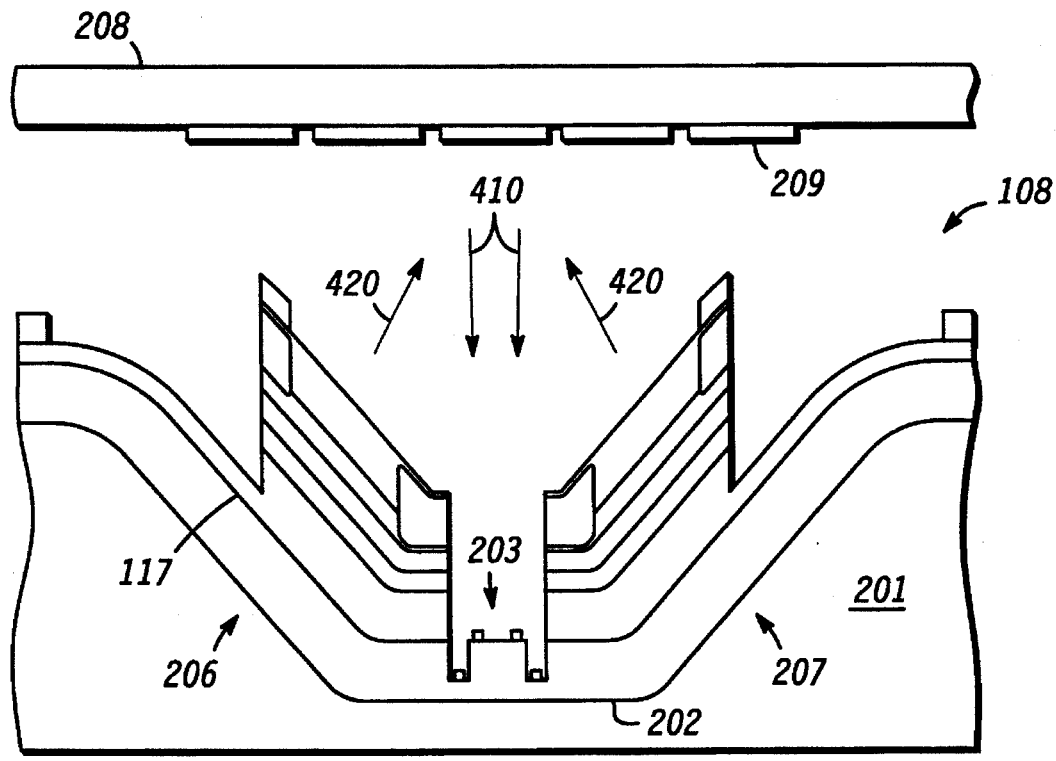
FIG. 2 is a simplified sectional view of an example of an embodiment of the sensor scanning system.

Referring to FIG. 2, an enlarged simplified sectional view of an embodiment of data scanning system 108 is illustrated, as well as a portion 208 of business card 111. It should be understood that FIG. 2 represents only one particular example of a variety of data scanning systems capable of being used. Further, since FIG. 2 is a simplified example of data scanning system 108, many specific engineering details have been omitted to provide greater clarity to present the invention.

As shown in FIG. 2, sensor scanning system 108 includes several main elements, such as a substrate 201 having a groove 202, a photodetector 203, and light emitting devices 206 and 207. Textual material and graphical material printed on portion 208 of business card 111 is illustrated by blocks 209.

Arrows 420 depict light coming from light emitting devices 206 and 207. The light emitted from light emitting devices 206 and 207 strikes and is reflected by blocks 209, as illustrated by arrows 410, into photodetector 203. Photodetector 203 converts the reflected light into electrical signals. The electrical signals are then transported to the computer system (shown in FIG. 4) where the electrical signals are processed and assimilated into an intelligent format.

Figure 3:
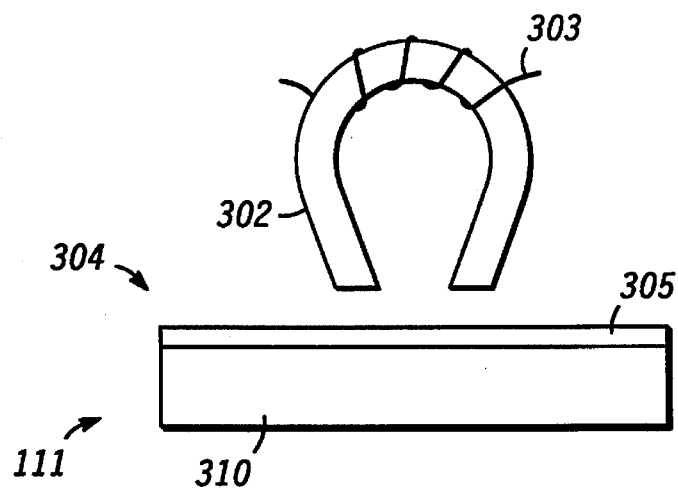
FIG. 3 illustrates a simplified pictorial illustration of a magnetic sensor.

FIG. 3 shows a simplified pictorial illustration of a magnetic sensor 301 reading a portion 304 of business card 111 that is magnetically encoded.

Portion 304 of business card 111 is made with a layer 305 that is magnetically encoded by any suitable well-known method in the art locatated on substrate 310, thereby enabling magnetic encoding of business card 111 with a wide variety of information. Typically, the information that is magnetically encoded is textual material, graphical material, or the like.

Magnetic sensors or readers, as illustrated by magnetic sensor 301, are well known in the art, thus are not discussed in detail herein. However, for illustrative purposes only, magnetic sensor 301 includes a magnetic core 302 having a magnetic field and a sensing coil 303 wound around core 302. Coil 303 is inductively coupled to magnetic core 302, thus enabling changes in the magnetic field to change currents flowing in coil 303. Passing of magnetically encoded business card 111 past magnetic sensor 301, generates a change in the magnetic field which is sensed by coil 303, thereby generating a signal which is subsequently routed to the electronics, as shown in FIG. 4.

Figure 4:
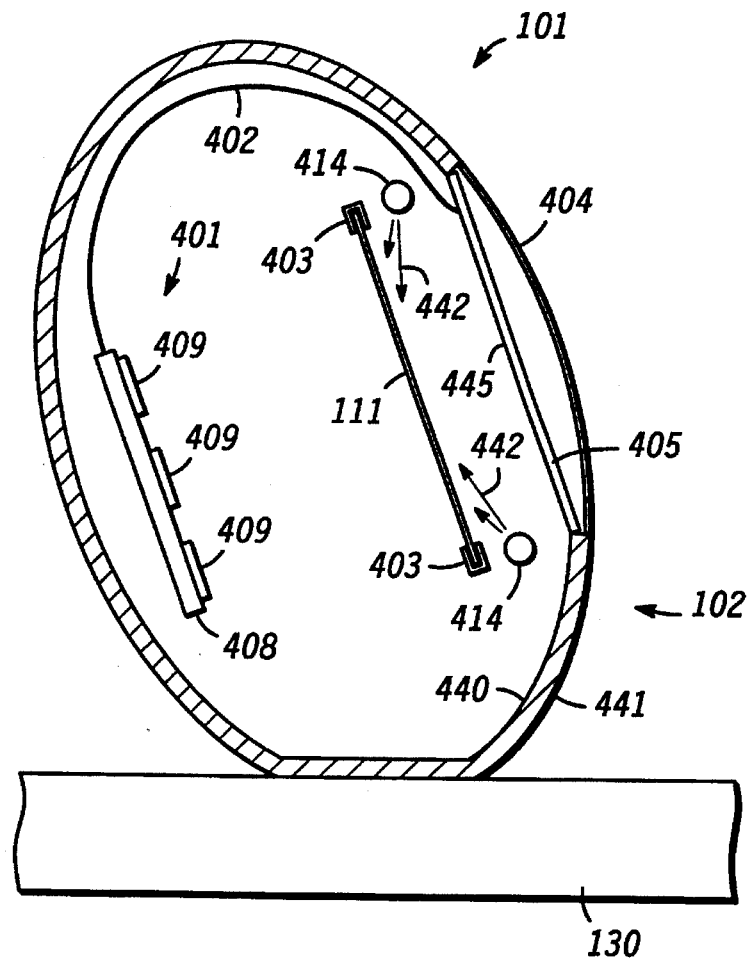
FIG. 4 is a simplified sectional view, as seen from 4—4 of FIG. 1.

FIG. 4 is a simplified sectional view of a business card scanning system 101, as seen from the line 4—4 of FIG. 1, resting on substrate 130. Business card scanning system 101 illustrates several elements, such as electronics 401, an electrical trace or electrical interconnect apparatus 402, brackets 403, optical element 404, and display 405. Additionally, an interior surface 440 and an exterior surface 441 of hollow body 102 is shown in FIG. 4.

Generally, electronics 401 illustrate several elements or features, such as interconnect substrate 408 and integrated circuits 409. Additionally, an interconnect apparatus 402 coupling electronics 401 and display 405 illustrates, in general, coupling of electronics 401 to various elements or features of business card scanning system.

Any suitable interconnect substrate 408, such as a printed circuit board, an FR4 board, a silicon interconnect substrate, or the like is usable for interconnect substrate 408. Generally, interconnect substrate 408 provides conductive paths for signals to be routed throughout interconnect substrate 408, as well as enabling signals to be received and transmitted from associated elements of business card scanning system, such as sensor system 108, function keys 107, accessory port 122, display array 405, brackets 403 and the like. For example, interconnect substrate 408 is coupled to display array 405 with interconnect apparatus 402.

Integrated circuits 409 are operably coupled to interconnect substrate 408. Integrated circuits 409 represent a variety electronic components, such as a microprocessor unit (MPU), a memory unit or data storage circuits, as well as standard electronic components, such as resistors, capacitors, and the like. The microprocessor unit includes signal processing circuitry or data processing circuits, as well as logic circuitry that controls or modifies a variety of functions or elements of business card scanning system 101, such as input and output of scanned data, sorting of scanned data, displaying scanned data, driving mechanical features, and the like. Generally, these functions are carried out as software or firmware associated with integrated circuits 409. Coupling of electronics 401 and the various elements or functions of the business card scanning system is achieved by any well-known method in the art, such as electrical coupling, optical coupling, or a combination of both optical and electrical coupling. By way of example, electronics 401 are coupled to display array 405 with an electrical or optical cable.

As is shown in FIG. 4, business card 111 is positioned in place by brackets 403. Brackets 403 hold business card 111 in place for direct viewing of business card 111. Additionally, brackets 403 aid in guiding business card passed scanning system 108 and into business card scanning system 101, thereby enabling viewing of business card 111 either directly or as an image. Brackets 403 are made using any suitable kind or style, such as mechanical, eletromechanical, or the like. Further, brackets 403 have a variety of functions, such as holding business card 111 in position for viewing, moving business card 111 into position for viewing, as well as being equipped with sensors so as to control the position of business card 111.

Optical element 404 includes any suitable optical element well known in the art, such as a transparent film, a refractive optical element, a diffractive optical element, or the like. However, in a preferred embodiment of the present invention, optical element 404 is a refractive optical element or a lens, thereby enabling business card 111 to be viewable in a large format so as to be more easily seen.

A light source 414 is made by any suitable method, such as incandescent light, fluorescent light, eletroluminesenct light, or the like. Light source 414 is operably coupled to electronics 401 so as to control activity of light source 414. Light source 414 emits light, illustrated by arrows 442, on business card 111, thus enabling the user to directly observe business card 111.

Display 405 is made by any suitable method in the art, such as, but not limited to, liquid crystal display (LCD), vacuum field emission devices (FED), electroluminescent technology, and light emitting diode technology. In a preferred embodiment of the present invention, display 405 uses liquid crystal display technology. The liquid crystal display is made of optically transparent materials, such as glass, polymers, and the like. The optically transparent materials are arranged with electrically conductive paths set out in rows and columns, such that electrical stimulation of a single row and a single column is optically effected to form a pixel. Further, since materials used for display 405 are substantially optically transparent, business card is directly viewable through display 405. Additionally, optimiziton of viewing of the pixels of display 405 is achieved by having surface 445 of display 405 switchable controlled from substantially optically transparent to substantially optically opaque. Selection of materials used to make display 405 is application specific, thus selection of transparent material is not necessary for the operation of the present invention. Additionally, it should be understood that selecting the appropriate display technology enables business card 111 to be seen as either a real image or a virtual image through display 405.

Figure 5:
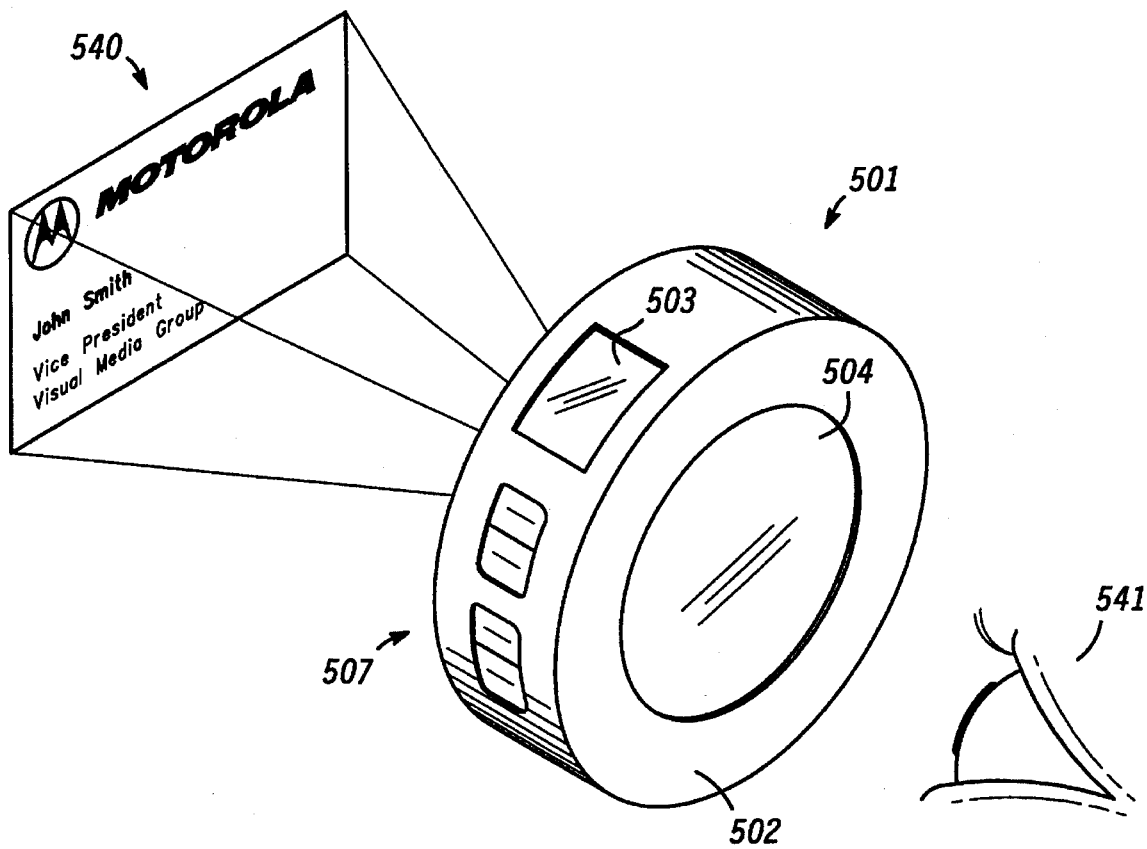
FIG. 5 illustrates a hand held embodiment of a business card scanning system.

FIG. 5 illustrates a simplified pictorial representation of a hand held portable business card scanning system 501 with a virtual image 540 as seen from an eye 541 of an observer or a user. It should be understood that similar features or elements as previously discussed in FIG. 1 will retain their original identifying numerals except that a numeral 5 will replace the first digit. Hand held business card system 501 includes several main features or elements, such as a plurality of controls or function keys 507, a hollow body 502, and an aperture or an opening 504, a computer system (not shown) contained within hollow body 502.

Hand held portable business card scanning system 501 contains similar features or elements including, but not limited to, electronics, scanning system, and optical and electrical coupling as previously described; however, in the FIG. 5 these elements or features are not illustrate. Opening 504 is used to insert a business card (not shown) to be scanned. Additionally, hollow body 502 includes an opening 503 for viewing a virtual display as seen by eye 541, representing an observer or a user. A virtual display enables eye 541 to visualize a virtual image 540 by looking through opening 503. As illustrated in FIG. 5, virtual image 540 is a business card which is stored in the computer described with reference to FIG. 4. It should be understood that the computer, stores a plurality of previously scanned in business cards that the user is able to access through manipulating the plurality of function keys 507.

Figure 6:
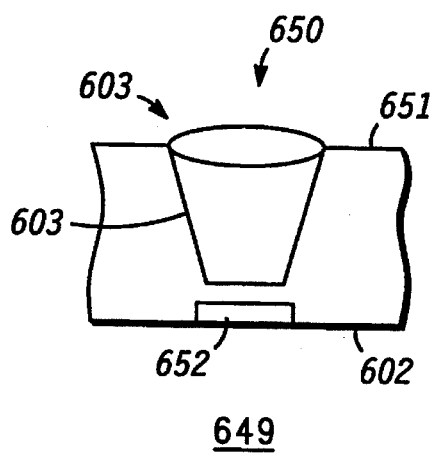
FIG. 6 illustrates a sectional view of a miniature virtual image display system.

Referring to FIG. 6, a simplified sectional view of a miniature virtual image display system 649 is illustrated. A more detailed description of a miniature virtual image display is found in United States patent titled WAVEGUIDE VIRTUAL IMAGE DISPLAY having issued on Jun. 29, 1993 bearing U.S. Pat. No. 5,224,198 which is hereby incorporated by reference herein. It should be understood that similar features or elements as previously described in FIG. 5 will retain their original identifying numerals except that a numeral 6 will replace the first digit. Miniature virtual image display 649 includes image generation apparatus 652 for providing a real image to an optical system 650 which in turn produces a virtual image 540, as seen in FIG. 5. Optical system 650 is constructed to magnify the entire real image from image generation apparatus 652 without utilizing moving parts, such that the virtual image viewable through an opening 603 is a complete frame or a complete business card, which appears to be very large and is easily discernible by the operator. Image generation apparatus 652 is connected to electronics, such as electronics 401 of FIG. 4, and generates a real image from stored electrical signal representing any business card previously scanned and stored. By producing a virtual image from the real image generated by image generation apparatus 652, display 649 enables business cards previously scanned to be accessed by hand held portable business card reader 501, as shown in FIG. 5, at any time.

Image generation apparatus 652 is made such that the entire image is displayed on a semiconductor chip. Several technologies are capable of providing this kind of an array or a display, such as field emission devices, light emitting diodes, or the like. It should be understood that selection of specific technologies used to manufacture image generation apparatus 652 is application specific. However, in a preferred embodiment of the present invention, a light emitting diode technology typically is used for manufacturing image generation apparatus 652.

Figure 7:
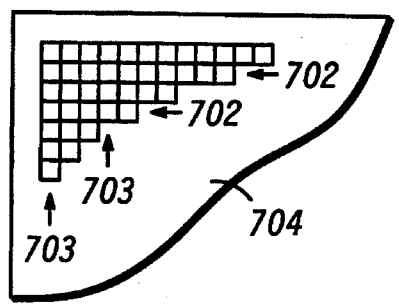
FIG. 7 illustrates a plan view of a light emitting device array, portions thereof broken away.

Referring now to FIG. 7, a plane view of a light emitting device array 701 is illustrated in which pixels are formed in regular patterns of rows 702 and columns 703 on a single semiconductor chip 704. Generally each pixel, the intersection of a single row and a single column, ranges in size from 0.5 micron to 20.0 microns, thus allowing a variety of pixel sizes to be utilized by the designer. However, it should be understood that in order to achieve greater density and greater resolution smaller pixel sizes will be required.

Figure 8:
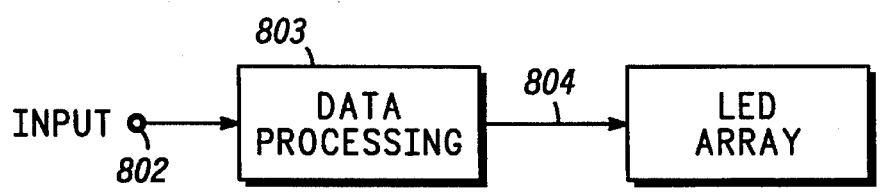
FIG. 8 illustrates a functional block diagram of a business card scanning system.

FIG. 8 illustrates a functional block diagram 801 of electronics used in business card scanning system 101 and portable hand-held scanning system 501. Generally, functional block diagram 801 includes several main features or elements, such as an input 802, data processing 803, an output 804, and an array 701.

Input 802 of signals, i.e., electrical signals, optical signals, or the like, are entered to input 802. These signals can come from a variety of sources or devices, such as a Personal Computer (not shown), scanning system 108, PDA, or the like. Signals from input 802 are directed to data processing 803. Data processing 803 is a mixture of hardware, firmware, and software that interacts with the signals. The mixture of hardware, firmware, and software provide several control functions, for example, logic functions, memory functions, and switching arrays for controlling output 804 and displays 405, and 602, as shown in FIGS. 8, 4, and 6, respectfully. Further, it should be understood that data processing provides the user with the to manipulate the data contained in data processor in a useful manner. For example, software contained in data processor 803 use word or letter recognition to place the previously scanned in business cards in alphabetical order so as to enable the user to manipulate the incoming signal. In yet another example, the previously scanned business cards are scanned for name recognition, thereby enabling the user to find a single individual or group of individuals associated with a particular name. Output 804 is capable of being directed to a variety of output displays such as a miniature display 602, display 405, personal computer (not shown), or the like.

By now it should be appreciated that a novel business card scanning system has been described. The business card scanning system allows for better and efficient communication and information exchange. By utilizing a mixed-media format business cards greater flexibility in communication is enhanced. Further, by changing information on business cards into electronic format allow for sorting and organization of information contain on business card to be more efficiently utilized.

We claim:

1. A business card scanning system comprising:

a hollow body having an exterior surface, an interior surface, a first aperture, and a second aperture, the first aperture being designed for receiving a business card inserted into the hollow body;

a viewing port positioned in optical communication with the second aperture of the hollow body to directly view the inserted business card; and a data scanning system including a sensor, data processing circuits, and data storage circuits mounted in the hollow body, the data scanning system being positioned to scan the business card to generate data therefrom, the generated data is coupled to and processed by the data processing circuits and processed data from the data processing circuits is coupled to and stored in the data storage circuits.

2. A business card scanning system as claimed in claim 1 wherein the viewing port includes a lens for magnifying the business card.

3. A business card scanning system as claimed in claim 1 wherein the viewing port further includes a display mounted therein having an array of pixels arranged in rows and columns that are operably connected to the data processing circuits so as to generate an electronic graphic display.

4. A business card scanning system as claimed in claim 3 wherein the display is switchably transparent, the display being switchable from substantially optically clear to substantially optically opaque.

5. A business card scanning system as claimed in claim 4 further including a light source located in the hollow body to provide illumination on the business card.

6. A business card scanning system as claimed in claim 1 wherein the sensor is an optical sensor.

7. A business card scanning system as claimed in claim 6 wherein the sensor is a bar code sensor.

8. A business card scanning system as claimed in claim 1 wherein the sensor is a magnetic sensor.

9. A method for scanning a business card comprising the steps of:

providing a hollow body having a exterior surface, an interior surface, a first aperture, and a second aperture, the first aperture being designed for receiving a business card inserted into the hollow body;

providing a viewing port system positioned in optical communication with the second aperture of the hollow body to directly view the inserted business card; and providing a data scanning system including a sensor, data processing circuits, and data storage circuits mounted in the hollow body;

scanning the business card utilizing the data scanning system to generate data therefrom and supplying the generated data to the data processing circuits;

processing the data utilizing the data processing circuits; and storing the data in the data storage circuits.

10. A method for scanning a business card as claimed in claim 9 wherein the step of scanning the business card is achieved by optically scanning the business card.

11. A method for scanning a business card as claimed in claim 10 wherein the step of optically scanning the business card is achieved by scanning a bar code.

12. A method for scanning a business card as claimed in claim 9 wherein the step of scanning the business card is achieved by magnetically scanning the business card.

13. A business card scanning and imaging system comprising:

a hollow body having an exterior surface, an interior surface, a first aperture, and a second aperture, the first aperture being designed for receiving a business card inserted into the hollow body;

a visual display system positioned in the second aperture of the hollow body and designed to receive data and display an image generated from the data; and a data scanning system including a sensor and data processing circuits mounted in the hollow body and coupled to supply data to the visual display system, the data scanning system being designed to scan the business card to generate data therefrom and communicate the data to the visual display system.

14. A business card scanning and imaging system as claimed in claim 13 wherein the visual display system is a matrix of pixels arranged in electrically defined rows and columns, the matrix of pixels are operably coupled to the data scanning system.

15. A business card scanning and imaging system as claimed in claim 13 wherein the sensor is an optical sensor.

16. A business card scanning and imaging system as claimed in claim 15 wherein the optical sensor scans bar codes.

17. A business card scanning and imaging system as claimed in claim 13 wherein the sensor is a magnetic sensor.

18. A business card scanning and imaging system as claimed in claim 13 further comprising data storage circuits coupled to the data scanning system for receiving data therefrom and an accessory port operably connected to the data storage circuits to input data and to output data to and from the data storage circuits to an external device.

19. A hand-held electronic business card scanning and imaging system comprising:

a portable hand-held hollow body having an exterior surface, an interior surface, a first aperture, and a second aperture, the first aperture being designed for receiving a business card inserted into the hollow body;

a virtual image display system positioned in the second aperture of the hollow body and designed to receive data and display an image generated from the received data; and a data scanning system including a sensor, data processing circuits, and data storage circuits mounted in the hollow body, the data scanning system being designed to scan the business card and to generate data therefrom, and the data scanning system being electrically coupled to supply the data to the virtual image display system.

20. A hand-held electronic business card scanning and imaging system as claimed in claim 19 wherein the virtual image display system includes an image generating device and an optical system, the image generating device produces an image that is magnified by the optical system and view as the virtual image.

* * * * *